(12) United States Patent
O'Connell (10) Patent No.: US 6,588,459 B2
(45) Date of Patent: *Jul. 8, 2003

(54) FUEL TANK FILLER NECK AND METHOD OF MANUFACTURING SAME

(75) Inventor: Patrick R. O'Connell, Rochester Hills, MI (US)

(73) Assignee: Shelby Enterprises, Inc., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/998,113

(22) Filed: Nov. 30, 2001

(65) Prior Publication Data

US 2002/0083997 A1 Jul. 4, 2002

Related U.S. Application Data

(63) Continuation-in-part of application No. 09/454,103, filed on Dec. 3, 1999, now Pat. No. 6,330,893.

(51) Int. Cl.$^7$ ................................................. B65B 1/04
(52) U.S. Cl. ...................... 141/46; 141/286; 220/86.2
(58) Field of Search ........................ 72/467, 468, 347, 72/276, 370; 141/46, 301, 286, 59, 349, 350; 220/86.2

(56) References Cited

U.S. PATENT DOCUMENTS

| | | |
|---|---|---|
| 3,602,030 A | 8/1971 | Noda |
| 4,195,673 A | 4/1980 | Johnston et al. |
| 4,234,098 A | 11/1980 | Miller et al. |
| 4,386,514 A | 6/1983 | Herten |
| 4,462,620 A | 7/1984 | Bambenek et al. |
| 4,635,813 A | 1/1987 | Peickert |
| 5,360,040 A | 11/1994 | Thorn et al. |
| 5,385,179 A | 1/1995 | Bates et al. |
| 5,415,316 A | 5/1995 | Pemberton et al. |
| 5,507,324 A | 4/1996 | Whitley, II et al. |
| 5,590,806 A | 1/1997 | Green et al. |
| 5,673,738 A | 10/1997 | Spaulding |
| D392,020 S | 3/1998 | Fairles |
| 5,735,322 A | 4/1998 | Palvolgyi |
| 5,791,387 A | 8/1998 | Palvolgyi |

OTHER PUBLICATIONS

A Fuel Tank Filler Neck with a welded seam was designed By Ford Motor Company and fabricated by Shelby Enterprises more than 1 year prior to the filing of the parent application. Attached are four photographs of that filler neck. This filler neck is made by a process of repeated reductions and expansions of a seamed welded tube (no date).

Primary Examiner—Steven O. Douglas
(74) Attorney, Agent, or Firm—Brooks & Kushman P.C.

(57) ABSTRACT

A fuel tank filler neck is provided to reduce the escape of gasoline vapor from an automobile fuel tank system and is leak tight. The filler neck is configured to receive a fuel supply nozzle. The filler neck includes a one-piece seamless funnel member having a tubular body and an elongated tubular member. The funnel member defines in off-set axial relation a relatively large inlet opening adapted for attachment to a receptor for the nozzle and a relatively small necked down outlet opening adapted for attachment to the inlet of an elongated tubular member. The tubular member is adapted to be in communication with the fuel tank. A method for manufacturing the fuel tank filler neck is also disclosed.

32 Claims, 4 Drawing Sheets

FUEL TANK FILLER NECK AND METHOD OF MANUFACTURING SAME

CROSS-REFERENCE TO RELATED APPLICATIONS

This application is a continuation-in-part of U.S. application Ser. No. 09/454,103 filed Dec. 3, 1999 is now U.S. Pat. No. 6,330,893.

TECHNICAL FIELD

The present invention relates to the fuel tank filler neck connected to the gas tank of an automobile.

BACKGROUND ART

Gas tank fuel systems with reduced gasoline vapor loss are becoming increasingly important in the automobile industry to reduce needless loss of fuel. The typical solution to this problem has been to reduce the diameter of at least a section of the fuel tank filler neck. Though this approach has been somewhat successful, it is limited because as the diameter of the filler neck is decreased, the resistance to flow of the gasoline is increased. The increased resistance causes the fill neck to become filled during vehicle refueling thereby blocking release of any pressure buildup and causing the fuel nozzle to shut off prematurely before the fuel tank is full. Another consideration in preventing the loss of fuel, is the permeability of the materials from which the fuel tank system is made. Fuel vapors escape by diffusing through the various types of mild steels of which components of fuel tank systems are typically made. This fuel escape is particularly apparent after the mild steel components have corroded to any degree.

Another disadvantage of the current methods of reducing gasoline vapor losses is that typically the end of the gas line filler neck is flared out in order to provide a sufficient diameter to accept the gas nozzle during refueling. These filler necks are often made by a process of repeated reductions and expansions of a seamed welded tube. Accordingly, there is an increasing tendency for the integrity of the weld to leak as thinner diameter tubes are utilized.

DISCLOSURE OF INVENTION

The filler neck for receiving a fuel supply nozzle for a motor vehicle fuel tank includes a one-piece seamless funnel member having a tubular body. The funnel member defines in off-set axial relation a relatively large inlet opening adapted for attachment to a receptor for the nozzle and a relatively small necked down outlet opening adapted for attachment to the inlet of an elongated tubular member in communication with the fuel tank. The offset relationship of the inlet and outlet opening induces a swirling motion in the fuel flow as the fuel proceeds towards the fuel tank. The resultant swirl motion of the flowing fuel leaves an opening through which any pressure buildup in the fuel tank may be vented. The spiraling motion of the fuel through the narrow elongated tube member also assists in preventing fuel vapors from escaping during refueling because of an induced suctioning effect that is created by the spiraling motion of the fuel through a narrow cavity.

In another embodiment of the invention, the seamless funnel member is drawn and provided with an attachment portion adjacent to the inlet opening for attaching a gas nozzle receptor to the funnel member. The seamless surface of the filler neck allows for the receptor to protrude into the filler neck and form a seal to the inner surface of the filler neck.

In still another embodiment of the invention, the seamless funnel member is attached to the elongated member inlet by either a braised joint, an adhesive joint, or a resistance welded joint.

In yet another embodiment of the invention, the seamless filler neck is provided with an anti-corrosive coating.

In the preferred embodiment of the invention, the relatively large diameter section forming the inlet opening into which the gas nozzle is positioned and a spaced-apart relatively smaller diameter tubular section forming the outlet opening are in an axially offset relationship. These tubular sections are connected to one another by a tapered section which gradually blends from the large diameter section to the small diameter section. In a refinement of this embodiment, the tapered section intersects the large diameter section at an elliptically-shaped junction which lies in a plane inclined 60–85° from the axis of the tubular sections. In a further refinement of this embodiment, the funnel inlet opening has a diameter $D_1$ and the tubular section has a diameter $D_2$ with a coaxial offset at a distance X where $0.1D_2$ is less than X which is less than $0.3D_2$, and where $D_1$ is at least one and a half times $D_2$. In yet another refinement of this embodiment of the invention, the funnel inlet axial offset is sufficient to achieve fuel swirl during fuel filling.

In another embodiment of the invention, the funnel inlet opening has a diameter D-1 and the outlet opening has a diameter D-2 where D-1 is at least one and a half times D-2. In a refinement of this embodiment, $D_2$ is less than 35 mm. In a further refinement of this embodiment, $D_2$ is less than 30 mm.

This invention also includes a method of manufacturing the filler neck for a motor vehicle fuel tank. First, the filler neck is formed by deep-drawing a seamless funnel member having an elongated tubular body with an enlarged inlet at one end and a relatively small outlet at the opposite end. A length of butt-seam tubing is cut to form a tubular member of desired length. An end of the tubular member is telescopically aligned with the outlet of the funnel member to securely join the funnel and tubular members together. The tubular member is bent to a desired shape. A nozzle receptor is attached to the funnel member adjacent the funnel inlet. In a refinement of the method, the configuration is then leak tested to verify the integrity of joining the funnel member to the tubular member and the attachment of the nozzle receptor to the funnel member, and the integrity of the butt-seam joint and the tubular member subsequent to bending. The funnel member is attached to the tubular member by braising, adhesive bonding, or welding. In yet another refinement of the method, a portion of the filler neck is configured to induce a sufficient swirl to create a hollow passage for suctioning fuel vapors to prevent their escape during refueling and to provide a vent passage for any pressure buildup in the fuel tank.

Accordingly, it is an object of the present invention to provide an improved fuel tank filler neck.

Another object of the present invention is to provide an improved fuel tank filler neck that inhibits the escape of gasoline vapors from the fuel tank.

Still another object of the present invention is to provide an improved fuel tank filler neck that is inexpensive to fabricate.

Still another object of the present invention is to provide an improved fuel tank filler neck that vents pressure buildup created in the fuel tank during refueling.

Still another object of the present invention is to provide an improved fuel tank filler neck that does not leak.

Yet another object of the present invention is to provide an improved method for fabricating the fuel tank filler neck of the foregoing objects.

Another more specific object of the invention is a method for forming a filler neck for a motor vehicle fuel tank by deep-drawing a seamless funnel member having an elongated tubular body with an enlarged inlet at one end and a relatively small outlet at the opposite end. A length of butt-seam tubing is cut to form a tubular member of desired length. An end of the tubular member is telescopically aligned with the outlet of the funnel member and securely joining the funnel and tubular members together. The tubular member is bent to a desired shape. A nozzle receptor is attached to the funnel member adjacent the funnel inlet.

Another more specific object in the method of the last mentioned object includes a portion of the filler neck configured to induce a sufficient swirl to create a hollow passage for venting vapors from the gas tank during fuel filling.

In carrying out the above objects and other objects and features of the present invention, a fuel tank filler neck is described in a mounting relationship to the vehicle fuel tank. The fuel tank filler neck and the method for its manufacture provide advantages to an automobile manufacturer by reducing escape of gasoline vapors from the fuel tank, by permitting simple manufacturing of the filler neck, and by reducing attendant costs.

The above objects and other objects, features, and advantages of the present invention are readily apparent from the following detailed description of the best mode for carrying out the invention whin taken in connection with the accompanying drawings.

BRIEF DESCRIPTION OF DRAWINGS

FIGS. 7a–7i are schematic illustrations of the method steps for making the fuel tank filler neck of this invention.

BEST MODE FOR CARRYING OUT THE INVENTION

Article

Figure 1:
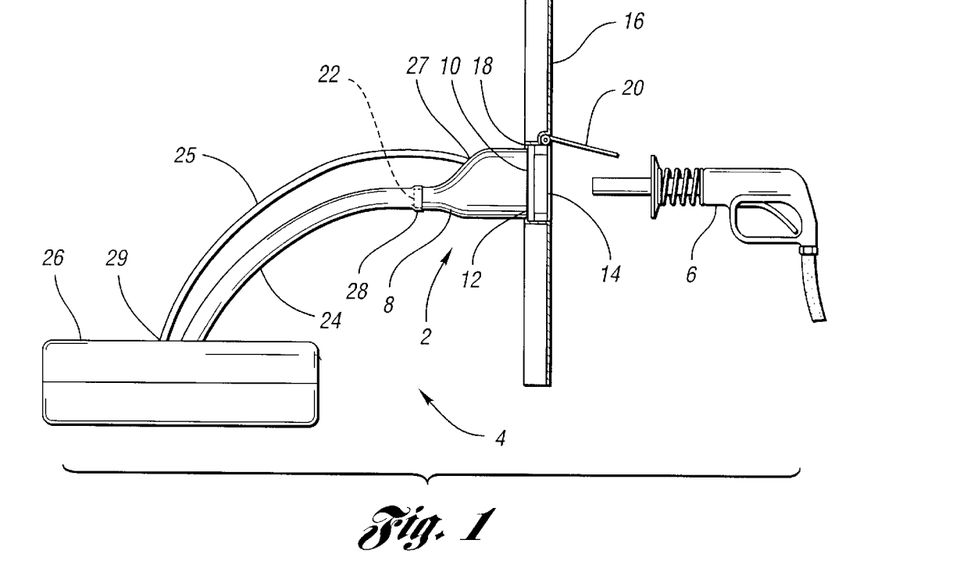
FIG. 1 is a schematic of a fuel tank filler neck incorporated in a automobile fuel tank system.

With reference to FIG. 1 a schematic of an embodiment of fuel tank filler neck 2 incorporated into automobile fuel tank system 4 is provided. Filler neck 2 for receiving fuel nozzle 6 for a motor vehicle fuel tank includes a one-piece funnel member 8 having a tubular body. One piece funnel member 8 may be made of a number of types of metals, suitable materials include but are not limited to cold rolled steel, zinc nickel, zinc galvanized, 304 stainless steel, 409 stainless steel, terne plate, tin plate, nickel plate, galvaneal, and aluminum. Funnel member 8 may also be made from injection molded plastics. Suitable injection molded plastics include, but are not limited to Acetal (25% glass fiber), PPH (40% glass fiber), Nylon 66 (33% glass fiber), Liquid Crystal Polymer (50% glass fiber) and Nylon 66 (60% glass ceramic fiber). The various grades of stainless steel are more desirable in that such materials are more efficient in preventing gasoline vapors from escaping into the environment. One end of funnel member 8 is defined by inlet opening 10 which is attached to nozzle receptor 12. Gas cap 14 screws directly into nozzle receptor 12. Fuel tank system 4 attaches to automobile body 16 through opening 18. Movable cover 20 conceals gas cap 14 when the vehicle is not being refueled. The other end of funnel member 8 is defined by outlet opening 22 that is attached to elongated tube member 24. Elongated tube member 24 attaches to fuel tank 26. During refueling gas cap 14 is removed and gas nozzle 6 is inserted into nozzle receptor 12. Fuel flows out of gas nozzle 6 into funnel member 8. Funnel member 8 induces a swirling motion in the fuel as the fuel proceeds to flow into elongated tube member 24. The swirling motion of the fuel continues as the fuel fills fuel tank 26. The swirling motion of the fuel created by funnel member 8, creates a suctioning effect that prevents fuel vapors from escaping into the atmosphere during refueling. The swirling motion of the fuel, also creates a central void that allows any pressure buildups created during refueling to vent thereby preventing premature shutoff of the fuel nozzle. Vent tube 25 connects to funnel member 8 at funnel vent hole 27 and to fuel tank 26 at fuel tank hole 29. Vent tube 27 allows displaced vapors in fuel tank 26 to be vented during refueling. The venting configuration defined by vent tube 27 may be replaced by a system that recirculates the fuel vapor. Such system are known to individuals skilled in the art.

Figure 2:
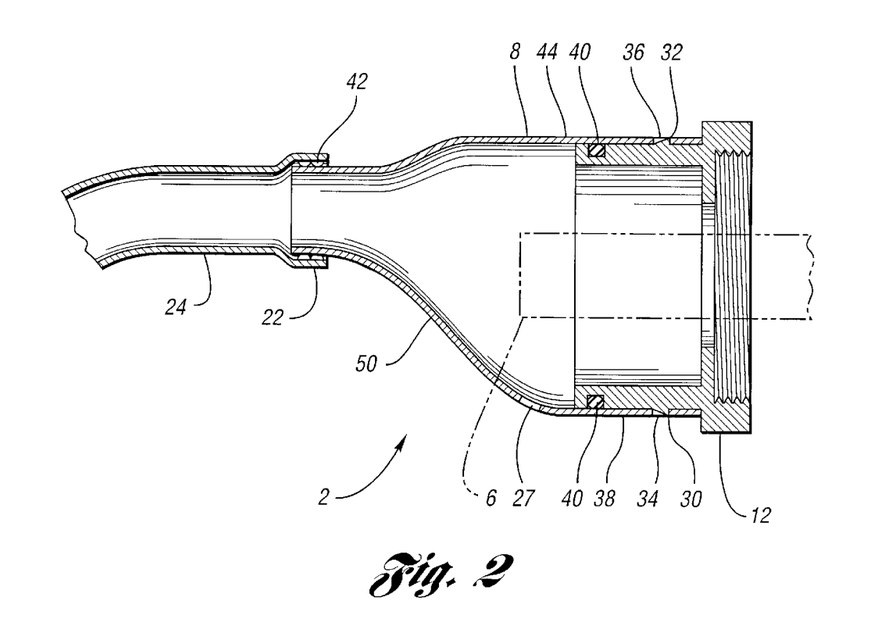
FIG. 2 is a fragmented cross sectional view of the fuel tank filler neck and an attached elongated member in the fuel tank system of FIG. 1 according to one embodiment of the present invention.

With reference to FIGS. 1 and 2, funnel member 8 defines in off-set axial relation a relatively large inlet opening 10 adapted for attachment to a gas nozzle receptor 12 and a relatively small necked down outlet opening 22 adapted for attachment to inlet 28 of elongated tubular member 24. The off-set axial relation between the inlet opening 10 and outlet opening 22 causes fuel emerging from gas nozzle 6 to impinge on side 30 of funnel member 8 and thereby causes fuel to spiral as the fuel proceeds forward to elongated tube member 24. Gas cap 14 screws directly into gas nozzle receptor 6. Filler neck 2 may optionally be provided with vent opening 27 for attachment to vent tube 25. Vent opening 27 may either be drilled in tunnel member 8 after it drawn or it may be incorporated in the sheet stock before funnel member 8 is drawn. Funnel member 8 is drawn and is therefore seamless. Funnel member 8 is provided with an cutouts 30, 32 adjacent to inlet opening 10 for attaching the nozzle receptor 6 to funnel member 8. Cutouts 30, 32 allow nozzle receptor 6 to snap into position via wings 34, 36 that protrude out of nozzle receptor 6. Because funnel member 8 is seamless, insert section 38 of nozzle receptor 6 is able to make intimate contact with funnel member 8 thereby creating a leak-proof seal via O-ring 40. Funnel member 8 is attached to the elongated member inlet 28 by braised joint 42. Optionally, filler neck 2 may be coated with an anti-corrosive coating 44.

Figure 3:
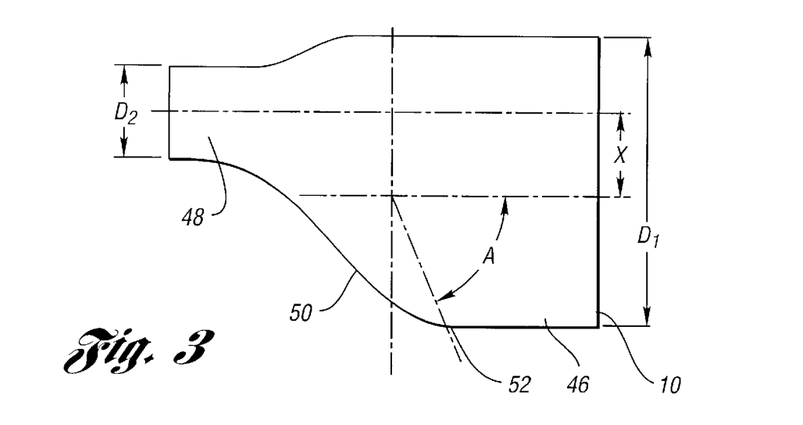
FIG. 3 is a schematic dimensional view of the filler neck as a funnel member according to an embodiment of the present invention.

With reference to FIG. 3, relatively large diameter section 46 forming the inlet opening 10 and the spaced-apart relatively smaller diameter tubular section 48 forming the outlet opening 22 are in an axially offset relationship. The large diameter section 46 and the small diameter tubular section 48 are connected to one another by tapered section 50 which gradually blends from the large diameter section 46 to the small diameter section 48. Tapered section 50 intersects large diameter section 46 at elliptically-shaped junction 52 which lies in a plane inclined at angle A which is 60–85° from the axis of the tubular sections. The funnel inlet opening 10 has a diameter $D_1$ of 60 mm and the tubular section has a diameter $D_2$ of 25 mm with a coaxial offset at a distance X which is 15 mm. This offset axial relationship is sufficient to achieve fuel swirl during fuel filling.

Figure 4:
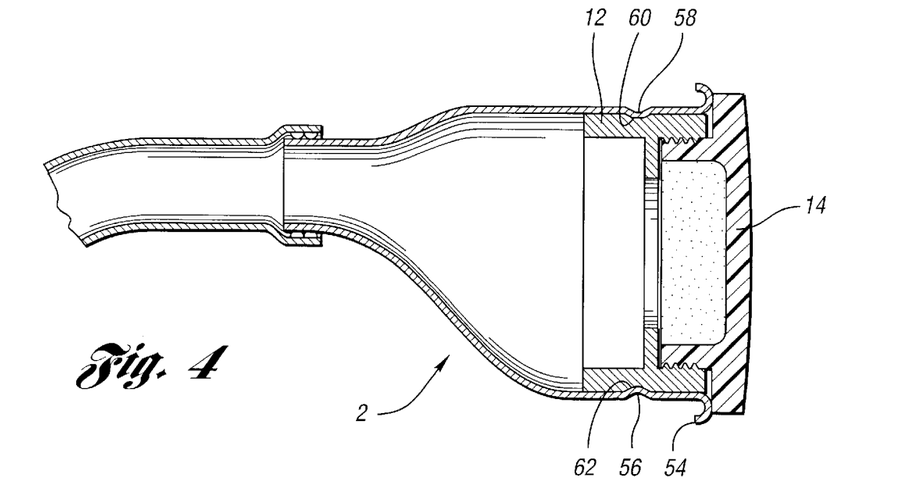
FIG. 4 is a cross sectional view of a rolled over top modification of the fuel tank filler neck according to another embodiment of the present invention.

With reference to FIG. 4, a modification of filler neck 2 is illustrated. Rolled over top 54 is formed at the top of large diameter section 46. In this modification, rolled over top 54 provides a sealing surface onto which gas cap 14 makes a seal. Gas cap 14 screws directly into nozzle receptor 12. Nozzle receptor 12 is held in position by crimps 56, 58 which project into indentations 60, 62 in nozzle receptor 12.

Figure 5:
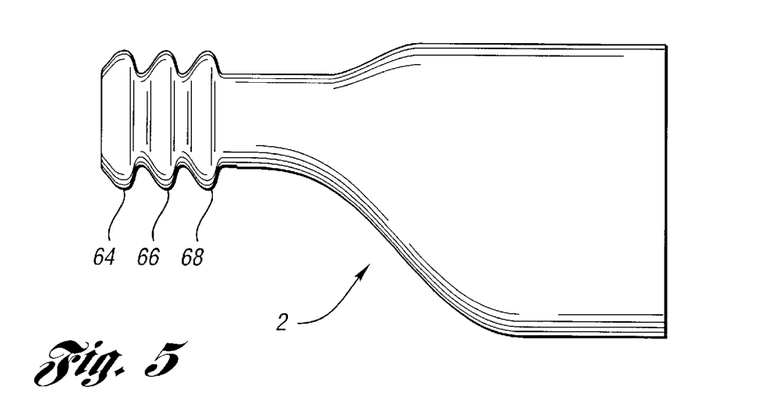
FIG. 5 is a cross sectional view of a barbed end design of the fuel tank filler neck according to another embodiment of the present invention.

With reference to FIG. 5, a modification of filler neck 2 is illustrated. The surface of the smaller diameter tubular section 48 is provided with barbs 64, 66, 68 This modification allows for plastic or rubber tubing to be utilized for the formation of elongated tube member 24.

Figure 6:
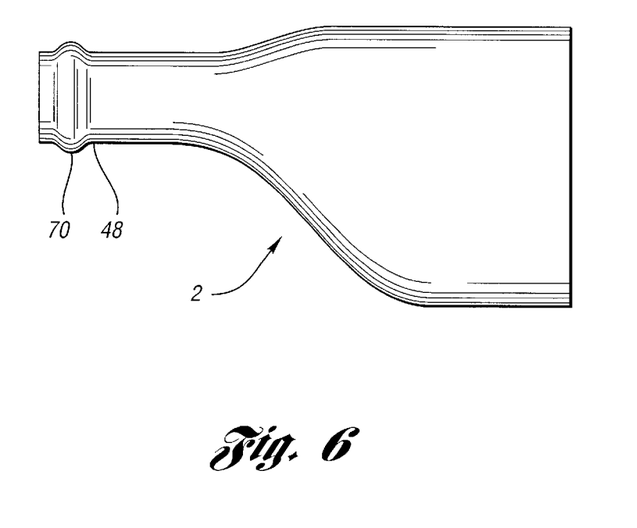
FIG. 6 is a cross sectional view of a hose bead modification of the fuel tank filler neck according to another embodiment of the present invention.
Figure 7A:
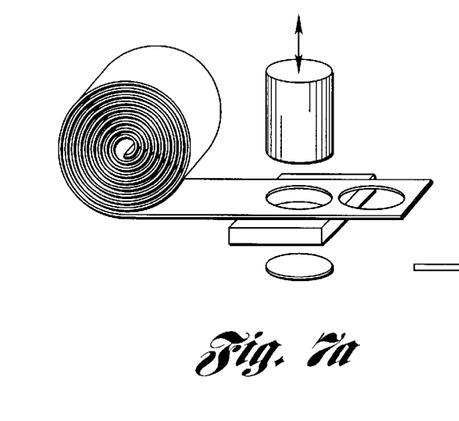
Figures 7A, 7B:
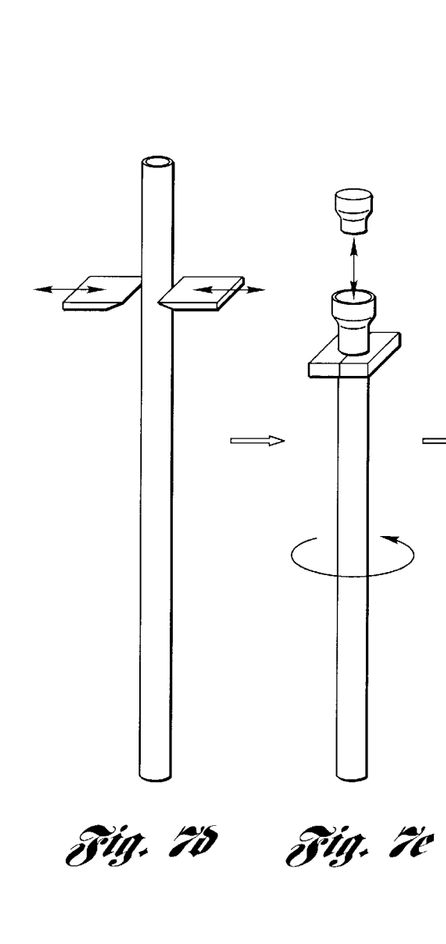
Figure 7B:
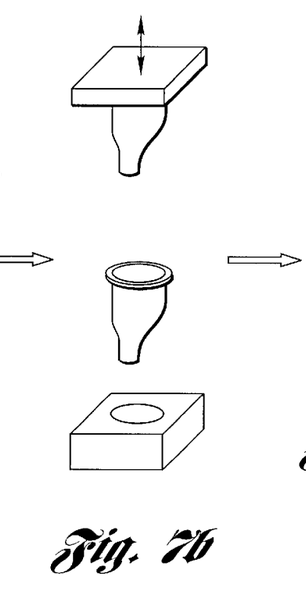
Figure 7C:
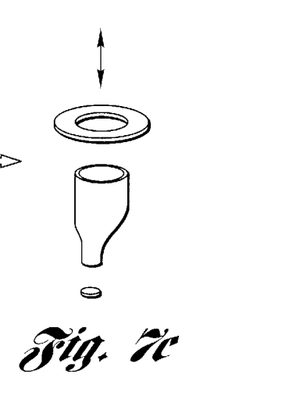
Figure 7D:
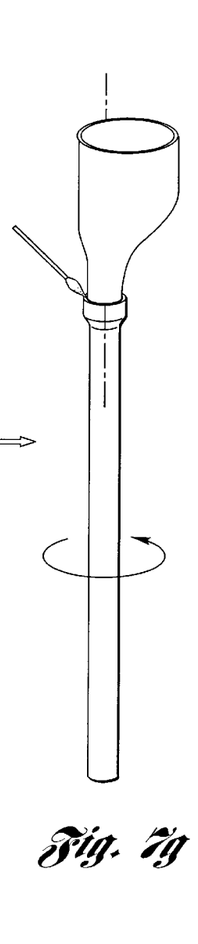
Figure 7E:
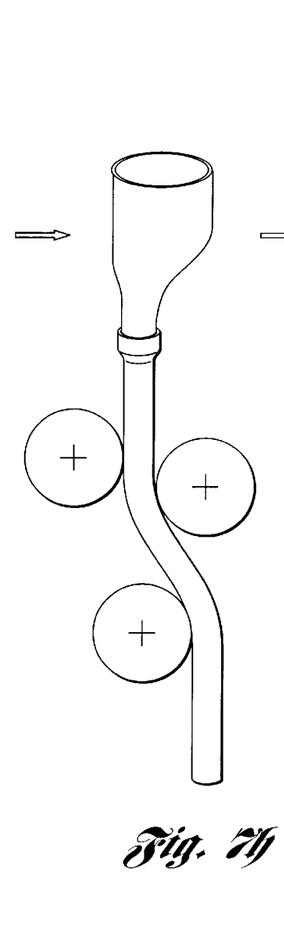
Figure 7F:
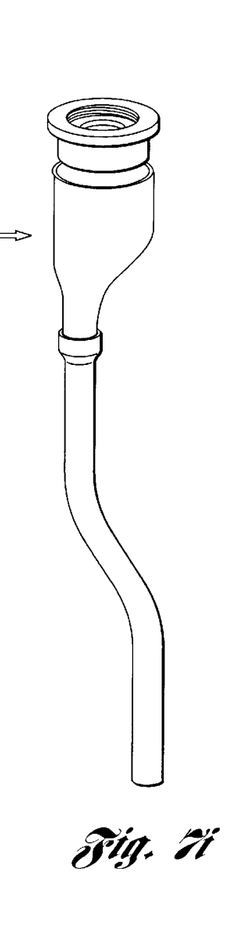

With reference to FIG. 6, a modification of filler neck 2 is provided. The surface of the smaller diameter tubular section 48 is provided with hose bead 70 This modification allows for plastic or rubber tubing to be utilized for the formation of elongated tube member 24.

Method

The fuel tank filler neck of this invention may be made by a number of process which includes eyelet/progressive stamping, eyelet stamping, progressive die stamping, transfer die stamping, and hydroforming. If the fuel tank filler neck is made of plastics, injection molding and compression molding are suitable methods for manufacturing the fuel tank filler neck.

The eyelet/progressive stamping method of manufacturing the fuel tank filler neck of this invention will now be described with reference to FIGS. 1, 2, 3 and 7. First, the filler neck 2 for motor vehicle fuel tank system 4 is formed by deep-drawing a seamless funnel member 8 having an elongated tubular body 24 with an enlarged inlet opening 10 at one end and a relatively small outlet opening 22 at the opposite end. A length of butt-seam tubing is cut to form a tubular member 24 of desired length. An end of the tubular member is telescopically aligned with outlet opening 22 of funnel member 8 and securely joining the funnel and tubular members together. Elongated tubular member 24 is bent to a desired shape. Nozzle receptor 12 is attached to funnel member 8 adjacent funnel inlet opening 10. In a refinement of this embodiment, the configuration is then leak tested to verify the integrity of joining funnel member 8 to tubular member 24 and the attachment of nozzle receptor 12 to funnel member 8, and the integrity of the butt-seam joint 42 and the tubular member 24 subsequent to bending. The funnel member 8 is attached to the tubular member 24 by braising, adhesive bonding, or welding. In yet another refinement of this embodiment, a portion of the filler neck 2 is configured to induce a sufficient swirl to create a hollow passage for suctioning fuel vapors into the tank 26 and to allow venting of any pressure buildup during in fuel tank 26 during refueling.

With reference to FIG. 7, schematic illustrations of the method steps for making the fuel tank filler neck of this invention and attaching the elongated tube member are provided. In step 7a, sheet stock is preformed into a circular blank that is drawn into a funnel shape in step 7b. The ends of the funnel shape are next trimmed in step 7c to remove excess stock and thereby form funnel member 8. In step 7d, pipe stock is cut to desired length to form elongated tube member 24. Elongated tube member 24 is then flared at the ends in step 7i in order to provide an attachment mechanism to the funnel member. The elongated tube and funnel member are then aligned in step 7f and brazed together in step 7g. The funnel member and elongated tube combination is then bent in step 7h. Nozzle receptor 12 is then inserted in step 7i.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A filler neck for receiving a fuel supply nozzle for a motor vehicle fuel tank comprising:
   a one-piece seamless funnel member having a tubular body defining in off-set axial relation to each other a relatively large inlet opening adapted for attachment to a receptor for positioning the nozzle with respect to the large inlet opening and a relatively small necked down outlet opening adapted for attachment to the inlet of an elongated tubular member in communication with the fuel tank, the positioning of the nozzle in combination with the off-set axial relation inducing a swirl to the fuel being supplied to the motor vehicle fuel tank.

2. The filler neck of claim 1 wherein the inlet opening is rolled over to create a surface to seal to the gas cap.

3. The filler neck of claim 1 wherein the small necked down outlet opening is barbed to adapt the opening for attachment to a plastic tube insert.

4. The filler neck of claim 1 wherein the small necked down outlet opening is formed into a hose bead to adapt the opening for attachment to a hose.

5. The filler neck of claim 1 further comprising a vent hole adapted for connection to a fuel tank vent tube.

6. The filler neck of claim 1 including the receptor and wherein the funnel member is drawn and provided with an attachment portion adjacent to the inlet opening for attaching the receptor to the funnel member.

7. The filler neck of claim 1 including the inlet of the elongated member and wherein the funnel member is joined to the elongated member inlet by a braise.

8. The filler neck of claim 1 including a tubular member and wherein the funnel member is joined to the tubular member inlet by adhesive.

9. The filler neck of claim 1 including a tubular member and wherein the funnel member is joined to the tubular member inlet by a resistance weld.

10. The filler neck of claim 1 including a tubular member and wherein the funnel member is joined to the tubular member inlet by a weld.

11. The filler neck of claim 1 including an exterior surface on the filler neck and wherein substantially all of the exterior surface of the filler neck is provided with an anti-corrosive coating.

12. The filler neck of claim 1 wherein the funnel member further comprises:
   a relatively large diameter section forming the inlet opening and a spaced-apart relatively smaller diameter tubular section forming the outlet opening wherein the axially offset large diameter and small diameter tubular sections are connected to one another by a tapered section which gradually blends from the large diameter section to the small diameter section.

13. The filler neck of claim 12 wherein the tapered section intersects the large diameter section at an elliptically-shaped junction which lies in a plane inclined 60–85° from the axes of the tubular sections.

14. The filler neck of claim 12 wherein the funnel inlet opening has a diameter $D_1$ and the tubular section has a diameter $D_2$ with a coaxial offset at a distance X where $0.1D_2$ is less than X which is less than $0.3D_2$, and where $D_1$ is at least one and a half times $D_2$.

15. The filler neck of claim 14 wherein the funnel inlet axial offset is sufficient to achieve fuel swirl during fuel filling.

16. The filler neck of claim 1 wherein the funnel inlet opening has a diameter D-1 and the outlet opening has a diameter D-2 where D-1 is at least one and a half times D-2.

17. The filler neck of claim 16 wherein $D_2$ is less than 35 mm.

18. The filler neck of claim 16 wherein the $D_2$ is less than 30 mm.

19. The filler neck of claim 1 wherein the one-piece seamless funnel member if made of metal.

20. The filler neck of claim 19 wherein the metal is selected from the group consisting of cold rolled steel, stainless steel, zinc galvanized, terne plate, tin plate, nickel plate, galvaneal, and aluminum.

21. The filler neck of claim 1 wherein the one-piece seamless funnel member if made of plastic.

22. The filler neck of claim 19 wherein the one-piece seamless funnel member if made by eyelet stamping.

23. The filler neck of claim 19 wherein the one-piece seamless funnel member if made by progressive die stamping.

24. The filler neck of claim 19 wherein the one-piece seamless funnel member if made by transfer die stamping.

25. The filler neck of claim 19 wherein the one-piece seamless funnel member if made by hydroforming.

26. The filler neck of claim 21 wherein the one-piece seamless funnel member if made by injection molding.

27. A The filler neck of claim 1 wherein the filler neck is made by hydroforming.

28. A method of forming a filler neck for a motor vehicle fuel tank comprising:

deep-drawing a seamless funnel member having an elongated tubular body with a relatively large inlet at one end and a relatively small outlet at the opposite end, cutting a length of butt-seam tubing to form a tubular member of desired length;

telescopically joining an end of the tubular member with respect to the outlet of the funnel member to securely join the funnel and tubular members together;

bending the tubular member to the desired shape; and attaching a nozzle receptor to the funnel member adjacent the funnel member inlet.

29. The method of claim 28 further comprising leak testing the filler neck to verify the integrity of joining the funnel member to the tubular member and the integrity of attaching the nozzle receptor to the funnel member, and the integrity of the butt-seam tubing of the tubular member subsequent to bending the tubular member to the desired shape.

30. The method of claim 28 wherein the funnel member is joined to the tubular member by braising.

31. The method of claim 28 wherein the funnel member is joined to the tubular member by adhesive bonding.

32. The method of claim 28 wherein the funnel member is joined to the tubular member by welding.

* * * * *

UNITED STATES PATENT AND TRADEMARK OFFICE
CERTIFICATE OF CORRECTION

PATENT NO. : 6,588,459 B2
DATED : July 8, 2003
INVENTOR(S) : Patrick R. O'Connell It is certified that error appears in the above-identified patent and that said Letters Patent is hereby corrected as shown below:

Column 1,
Line 7, "2000" should be -- 1999 --.

Column 3,
Line 31, "whin" should be -- when --.

Column 4,
Line 35, "system" should be -- systems --.
Line 49, after "it" insert -- is --.
Line 52, remove "an" after "with".

Column 5,
Line 20, after "68" insert -- . --.
Line 25, after "70" insert -- . --.
Line 32, "process" should be -- processes --.
Line 32, "includes" should be -- include --.
Line 62, remove "during" after "buildup".

Column 7,
Line 21, remove "the" after "wherein".
Lines 24, 30, 32, 34 and 37, "it" should be -- is --.

Column 8,
Lines 2 and 4, "it" should be -- is --.
Line 5, remove "A" at the beginning of the sentence.

Signed and Sealed this

Fourth Day of November, 2003

JAMES E. ROGAN
*Director of the United States Patent and Trademark Office*

US006588459C1

(12) EX PARTE REEXAMINATION CERTIFICATE (6115th)
United States Patent
O'Connell (10) Number: US 6,588,459 C1
(45) Certificate Issued: *Feb. 5, 2008

(54) FUEL TANK FILLER NECK AND METHOD OF MANUFACTURING SAME

(75) Inventor: Patrick R. O'Connell, Rochester Hills, MI (US)

(73) Assignee: Shelby Enterprises, Inc., Romeo, MI (US)

Reexamination Request:
No. 90/007,155, Aug. 4, 2004

Reexamination Certificate for:
Patent No.: 6,588,459
Issued: Jul. 8, 2003
Appl. No.: 09/998,113
Filed: Nov. 30, 2001

(*) Notice: This patent is subject to a terminal disclaimer.

Certificate of Correction issued Nov. 4, 2003.

Related U.S. Application Data (63) Continuation-in-part of application No. 09/454,103, filed on Dec. 3, 1999, now Pat. No. 6,330,893.

(51) Int. Cl.
*B65B 1/04* (2006.01)

(52) U.S. Cl. .......................... 141/46; 141/286; 220/86.2
(58) Field of Classification Search .................. None
See application file for complete search history.

(56) References Cited

U.S. PATENT DOCUMENTS

| | | | | |
|---|---|---|---|---|
| 2,033,931 A | * | 3/1936 | Erne | ........................ 222/541.6 |
| 2,104,461 A | | 1/1938 | Holm | ......................... 220/86.2 |
| 2,319,567 A | | 5/1943 | Vegell | |
| 2,331,234 A | * | 10/1943 | Rush | ........................... 210/478 |

(Continued)

FOREIGN PATENT DOCUMENTS

| | | | |
|---|---|---|---|
| DE | 24 52 248 | | 5/1975 |
| JP | 58-194627 | * | 12/1983 |
| JP | 60-156964 | | 8/1985 |
| JP | 61-125827 | * | 8/1986 |
| JP | 10-119595 | * | 12/1998 |

OTHER PUBLICATIONS

Plastics Processing Data Handbook, Second edition, Dominick V. Rosato, P.E. Publsihed by Chapman & Hall, 1997 Chapter 13, Rotational molding, pp. 552–557.*

Conference Proceedings ANTEC 1997 Plastics: Plastics Saving Planet Earth, vol. III–Special Areas Copyright / Pub. Date: 1997—Rotational Molding, Today and Tomorrow, by G.L. Beall, Glenn Beall Plastics, Ltd.*

JIS, Carbon Steel Tubes for Machine Structural Purposes, JIS G 3445–1977, Japanese Industrial Standards Committee, Revised Aug. 1, 1977, 11 Pages and Affidavit of Accuracy; Japanese Text Attached of JIS G 3445–1977, 11 Pages.

Japanese Industrial Standard, Carbon Steel Tubes for Machine Structural Purposes, JIS G 3445–1983, Japanese Industrial Standards Association, Revised 7,1988, 16 Pages; Japanese Text Attached of G3445–1983, Edition 1, 5 Pages.

Carbon steel tubes for machine structural purposes; Japanese Industrial Standard; JIS G 3445: 2004.

Carbon steel tubes for machine structural purposes; Japanese Industrial Standard; JIS G 3445: 1988.

*Primary Examiner*—Aaron J. Lewis (57) ABSTRACT

A fuel tank filler neck is provided to reduce the escape of gasoline vapor from an automobile fuel tank system and is leak tight. The filler neck is configured to receive a fuel supply nozzle. The filler neck includes a one-piece seamless funnel member having a tubular body and an elongated tubular member. The funnel member defines in off-set axial relation a relatively large inlet opening adapted for attachment to a receptor for the nozzle and a relatively small necked down outlet opening adapted for attachment to the inlet of an elongated tubular member. The tubular member is adapted to be in communication with the fuel tank. A method for manufacturing the fuel tank filler neck is also disclosed.

U.S. PATENT DOCUMENTS

| | | | |
|---|---|---|---|
| 2,336,430 A | | 12/1943 | Wery |
| 3,044,270 A | | 7/1962 | Biever |
| 3,180,376 A | | 4/1965 | Sanborn |
| 3,187,936 A | | 6/1965 | Downing |
| D217,180 S | * | 4/1970 | Holland .................. D7/700 |
| 3,602,030 A | | 8/1971 | Noda et al. ................ 72/347 |
| 3,750,722 A | * | 8/1973 | Nowak .................... 222/460 |
| 3,880,317 A | | 4/1975 | Arnett .................... 220/86.2 |
| 3,979,010 A | | 9/1976 | Fiedler et al. |
| 4,034,784 A | | 7/1977 | Ball et al. |
| 4,204,563 A | | 5/1980 | Pyle |
| 4,239,130 A | * | 12/1980 | Altadonna ............... 222/131 |
| 4,398,653 A | * | 8/1983 | Daloisio ................. 222/143 |
| 4,450,880 A | | 5/1984 | Scheurenbrand |
| 4,632,270 A | | 12/1986 | Sasaki et al. |
| 4,724,861 A | * | 2/1988 | Covert et al. ............ 137/202 |
| 4,782,974 A | | 11/1988 | Elkayam |
| 5,056,570 A | | 10/1991 | Harris et al. |
| 5,074,555 A | * | 12/1991 | Meredith ................. 473/323 |
| 5,271,438 A | | 12/1993 | Griffin et al. |
| 5,309,961 A | | 5/1994 | Franke et al. |
| 5,385,179 A | * | 1/1995 | Bates et al. .............. 141/312 |
| 5,507,324 A | * | 4/1996 | Whitley et al. ............ 141/59 |
| 5,647,415 A | * | 7/1997 | Onders et al. ............ 141/331 |
| 5,735,322 A | | 4/1998 | Palvolgyi ................ 141/386 |
| 5,860,460 A | | 1/1999 | Hidano et al. |
| 6,202,904 B1 | * | 3/2001 | Casciano ................. 222/567 |
| 6,264,072 B1 | * | 7/2001 | Johannes ................. 222/460 |
| 6,289,945 B1 | | 9/2001 | Haboush, II |
| 6,336,482 B1 | | 1/2002 | Cunkle et al. |
| 6,405,767 B1 | | 6/2002 | Marsala et al. |
| 6,585,015 B2 | | 7/2003 | Hughes |
| 2003/0089424 A1 | | 5/2003 | Gabbey et al. |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 36–62:

With reference to FIGS. 1 and 2, funnel member 8 defines in off-set axial relation a relatively large inlet opening 10 adapted for attachment to a gas nozzle receptor 12 and a relatively small necked down outlet opening 22 adapted for attachment to inlet 28 of elongated tubular member 24. The off-set axial relation between the inlet opening 10 and outlet opening 22 causes fuel emerging from gas nozzle 6 to impinge on side [30] *50* of funnel member 8 and thereby causes fuel to spiral as the fuel proceeds forward to elongated tube member 24. Gas cap 14 screws directly into gas nozzle receptor 6. Filler neck 2 may optionally be provided with vent opening 27 for attachment to vent tube 25. Vent opening 27 may either be drilled in tunnel member 8 after it is drawn or it may be incorporated in the sheet stock before funnel member 8 is drawn. Funnel member 8 is drawn and is therefore seamless. Funnel member 8 is provided with cutouts 30, 32 adjacent to inlet opening 10 for attaching the nozzle receptor 6 to funnel member 8. Cutouts 30, 32 allow nozzle receptor 6 to snap into position via wings 34, 36 that protrude out of nozzle receptor 6. Because funnel member 8 is seamless, insert section 38 of nozzle receptor 6 is able to make intimate contact with funnel member 8 thereby creating a leak-proof seal via O-ring 40. Funnel member 8 is attached to the elongated member inlet 28 by braised joint 42. Optionally, filler neck 2 may be coated with an anticorrosive coating 44.

AS A RESULT OF REEXAMINATION, IT HAS BEEN DETERMINED THAT:

The patentability of claims 28–32 is confirmed.

Claims 1 and 6 are determined to be patentable as amended.

Claims 2–5 and 7–27, dependent on an amended claim, are determined to be patentable.

New claims 33–41 are added and determined to be patentable.

1. A filler neck for receiving a fuel supply nozzle for a motor vehicle fuel tank comprising:
a one-piece seamless funnel member having a tubular body defining in off-set axial relation to each other a relatively large inlet opening adapted for attachment to a *nozzle* receptor for positioning the nozzle with respect to the large inlet opening and a relatively small necked down outlet opening adapted for attachment to the inlet of an elongated tubular member in communication with the fuel tank, the positioning of the nozzle in combination with the off-set axial relation inducing a swirl to the fuel being supplied to the motor vehicle fuel tank; and

*further comprising a nozzle receptor operable to receive the nozzle and position the nozzle with respect to a tapered surface defined by the off-set axial relation and disposed between the inlet opening and the outlet opening.*

6. The filler neck of claim 1 [including the receptor and] wherein the funnel member is drawn and provided with an attachment portion adjacent to the inlet opening for attaching the *nozzle* receptor to the funnel member.

*33. The filler neck of claim 1, further comprising a tapered surface defined by the off-set axial relation and disposed between the inlet opening and the outlet opening and formed at an angle relative to an axis of the inlet opening and an axis of the outlet opening, the tapered surface receiving fuel from the nozzle to induce the swirl to the fuel being supplied to the motor vehicle fuel tank so as to create a sufficient suctioning effect to prevent fuel vapors from escaping into the atmosphere.*

*34. The filler neck of claim 1, further comprising a tapered surface defined by the off-set axial relation and disposed between the inlet opening and the outlet opening and formed at an angle relative to an axis of the inlet opening and an axis of the outlet opening, the tapered surface receiving fuel directly from the nozzle to induce the swirl to the fuel being supplied to the motor vehicle fuel tank so as to create a sufficient suctioning effect to prevent fuel vapors from escaping into the atmosphere.*

*35. The filler neck of claim 1, wherein the inlet opening has a first center axis and the outlet has a second center axis offset from the first center axis and intersecting the inlet opening.*

*36. The filler neck of claim 35, further comprising a tapered surface defined by the off-set axial relation and disposed between the inlet opening and the outlet opening and receiving fuel from the nozzle to induce the swirl to the fuel being supplied to the motor vehicle fuel tank so as to create a sufficient suctioning effect to prevent fuel vapors from escaping into the atmosphere.*

*37. The filler neck of claim 35, further comprising a tapered surface defined by the off-set axial relation and disposed between the inlet opening and the outlet opening and receiving fuel directly from the nozzle to induce the swirl to the fuel being supplied to the motor vehicle fuel tank so as to create a sufficient suctioning effect to prevent fuel vapors from escaping into the atmosphere.*

*38. The filler neck of claim 1, wherein the inlet opening has a first axis and the outlet opening has a second axis offset from the first axis by a first dimension, which is less than one half a diameter of the inlet opening.*

*39. The filler neck of claim 38, further comprising a tapered surface defined by the off-set axial relation and disposed between the inlet opening and the outlet opening and receiving fuel from the nozzle to induce the swirl to the fuel being supplied to the motor vehicle fuel tank so as to create a sufficient suctioning effect to prevent fuel vapors from escaping into the atmosphere.*

*40. The filler neck of claim 38, further comprising a tapered surface defined by the off-set axial relation and disposed between the inlet opening and the outlet opening and receiving fuel directly from the nozzle to induce the swirl to the fuel being supplied to the motor vehicle fuel tank so as to create a sufficient suctioning effect to prevent fuel vapors from escaping into the atmosphere.*

41. The filler neck of claim 1, wherein the receptor includes a center axis that intersects the tapered surface such that fuel from the nozzle contacts the tapered surface to induce the swirl to the fuel being supplied to the motor vehicle fuel tank so as to create a sufficient suctioning effect to prevent fuel vapors from escaping into the atmosphere.

* * * * *